United States Patent [19]

Rapko

[11] 3,835,163
[45] Sept. 10, 1974

[54] TETRAHYDROFURAN POLYCARBOXYLIC ACIDS

[75] Inventor: John N. Rapko, St. Louis, Mo.

[73] Assignee: Monsanto Company, St. Louis, Mo.

[22] Filed: Aug. 2, 1973

[21] Appl. No.: 385,131

[52] U.S. Cl............ 260/347.3, 260/347.5, 252/135, 23/230
[51] Int. Cl.............................................. C07d 5/04
[58] Field of Search....... 260/347.3, 347.5; 252/135

[56] References Cited

OTHER PUBLICATIONS

Linn et al., "J. Amer. Chem. Soc." Vol. 87, 1965, pp. 3657–3665.
Linn et al., "J. Amer. Chem. Soc." Vol. 85, 1963 pp. 2032–2033.

Primary Examiner—Henry R. Jiles
Assistant Examiner—Mildred A. Crowder
Attorney, Agent, or Firm—Thomas N. Wallin; J. E. Maurer; Neal E. Willis

[57] ABSTRACT

Salts of tetrahydrofuran polycarboxylic acids represented by the formula

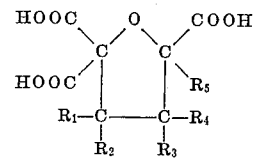

wherein $R_1$, $R_2$, $R_3$, $R_4$ and $R_5$ are hydrogen or carboxylic acid groups, at least one of $R_1$, $R_2$, $R_3$ and $R_4$ being a carboxylic acid group when $R_5$ is a carboxylic acid group are useful as complexing agents and/or detergency builders. The ester forms of such compounds, as well as the acids are useful as intermediates for production of the salts.

11 Claims, No Drawings

TETRAHYDROFURAN POLYCARBOXYLIC ACIDS

BACKGROUND OF THE INVENTION

This invention relates to novel tetrahydrofuran polycarboxylic acids and salts useful as complexing agents and detergency builders; to detergent formulations containing such compounds and to ester forms of such compounds useful, inter alia, as intermediates for preparation of the salts and acids.

The utility of compounds characterized by the ability to complex various metal and alkaline earth metal ions (particularly ions such as calcium ions which contribute to "hardness" of water) in aqueous media and/or provide, in combination with various detergent surfactants, detergent formulations of enhanced cleansing ability is well recognized by those skilled in the art. Such compounds are used in water treating applications (e.g. to "soften" water) and/or as detergency builders.

Although many compounds having complexing and/or detergency builder functionality are known the provision of novel compounds composed of only carbon, hydrogen and oxygen and having such functionality is desirable.

Since most known complexing agents form complexes with water hardness ions on a 1:1 mole basis, novel compounds having the ability to complex greater quantities of such ions are particularly desired.

SUMMARY OF THE INVENTION

It is an object of this invention to provide novel compounds useful as complexing agents and/or detergency builders and intermediates for the synthesis of such compounds. A further object of the invention is to provide novel detergent formulations containing the builder compounds of this invention.

The compounds of this invention are tetrahydrofuran polycarboxylic acids, their salts and esters whose structure, synthesis, and use will be understood from the following description of the preferred embodiments.

DESCRIPTION OF THE PREFERRED EMBODIMENTS

The compounds of the present invention are represented by the formula

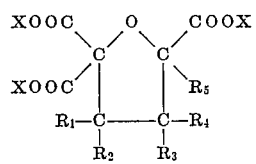

wherein X is hydrogen, alkali metal, ammonium, alkanol ammonium, (wherein the alkyl group contains from 1 to 4 carbon atoms) or an alkyl group containing from 1 to 20 carbon atoms (it is not necessary that all X groups in the compound be identical) and $R_1$, $R_2$, $R_3$, $R_4$ and $R_5$ are hydrogen or —COOX. At least one of the $R_1$, $R_2$, $R_3$ and $R_4$ groups must be —COOX when $R_5$ is COOX. Thus, the formula is seen to encompass acid, salt and ester compounds. It is further apparent that certain of the compounds, for example, those in which $R_1$ and $R_4$ are —COOX and $R_2$ and $R_3$ are hydrogen include both cis and trans configurations.

The salt forms of the compounds of this invention are useful as complexing agents and/or as detergency builders.

Tetrahydrofuran-2,2,3,4,5,5-hexacarboxylate salts, especially in the trans configurations and preferably the pentasodium salts, are preferred compounds of the invention in view of their ability to complex more than one mole of calcium ion per mole of hexacarboxylate salt.

The ester forms of the compounds of this invention are useful as intermediates for preparation of the salt forms as will be apparent from the subsequent description of methods of preparing compounds of this invention. In addition, certain of the esters (particularly those having more than 4 carbon atoms in the ester alkyl groups) will be found to exhibit plasticizer properties or, in the case of the higher alkyl (9 to 20 carbon atoms) esters, surfactant properties.

The ester forms of the compounds of this invention can be prepared by reactions represented by the equations:

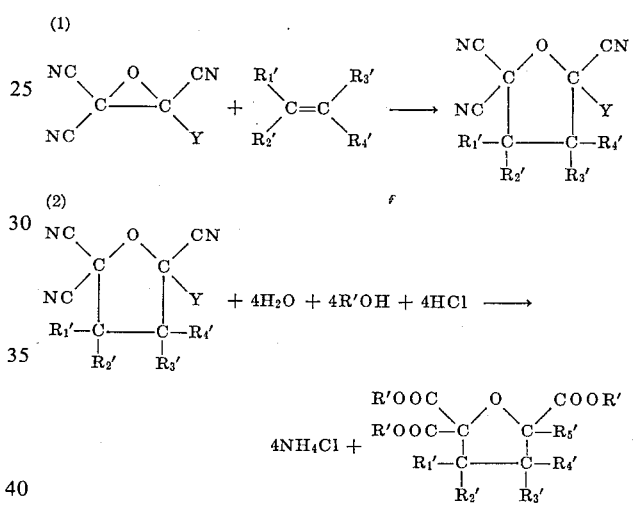

In the formulae of the above equations Y is hydrogen or CN, $R_1'$, $R_2'$, $R_3'$, $R_4'$ and $R_5'$ are hydrogen or COOR, at least one of $R_1'$, $R_2'$, $R_3'$ and $R_4'$ being COOR when $R_5'$ is COOR and R and R' are alkyl groups containing from 1 to 20 carbon atoms.

The number and position of carboxylate groups in the ester product is determined by the choice of the

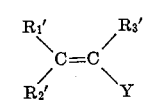

compound.

For example: the use of dimethyl maleate will yield a mixture of the cis and trans configurations of

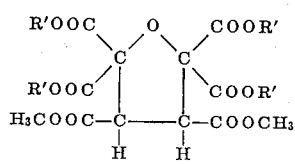

whereas the use of dimethyl fumarate will yield the trans form of this compound.

The use of methyl acrylate will yield

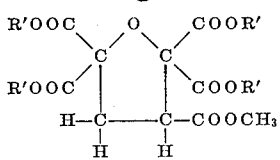

The use of methylene malonic ester $CH_2 = C(COOCH_3)_2$ will yield

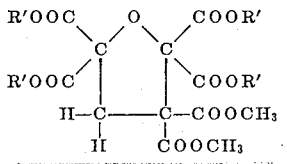

The use of ethene 1,1,2 trimethylcarboxylate will yield

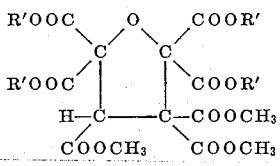

The use of ethene 1,1,2,2 tetramethylcarboxylate yields

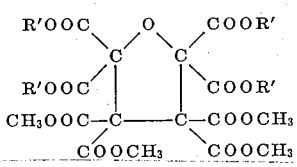

Higher esters are obtained by use of higher alkyl carboxylate esters in the reaction or by transesterifying the lower esters with the appropriate alcohol. The R' in the COOR' groups occupying the 2,2,5,5 positions corresponds to the R' in the alcohol (R'OH) used in the second reaction.

The reaction shown in the first equation can be conveniently conducted in an inert solvent, e.g., 1,2-dibromoethane, at a temperature sufficiently high to promote a reasonable rate of reaction, e.g., about 120°C in the case of dimethyl fumarate. Preferably, the reaction is conducted under reflux and a nitrogen blanket to prevent volatilization or oxidation of the reactants. The product is recovered by conventional crystallization and filtration techniques. Reactions of this general type are fully understood by those skilled in the art, and are discussed, for example, in U.S. Pat. No. 3,317,567.

The alcoholysis reaction shown in the second equation is preferably conducted by mixing the product of the first reaction with the requisite amount of water and alcohol cooling to about 0°C to 40°C; adding gaseous HCl; filtering to remove $NH_4Cl$; adding concentrated sulfuric acid as a catalyst and refluxing to complete the reaction.

The corresponding alkali metal salts are readily obtained by conventional saponification techniques (using less than stoichimetric amounts of alkali metal hydroxide if a partial salt such as the preferred pentasodium tetrahydrofuran 2,2,3,4,5,5-hexacarboxylate is desired). The corresponding ammonium and alkanol ammonium salts are more easily obtained by neutralization of the acid forms of the compounds of this invention.

Acidulation of the salt with a strong acid, e.g., HCl, $H_2SO_4$, or a strong acid ion exchange resin, will yield the acid forms of the compounds of this invention.

The tetrahydrofuran polycarboxylate salts of this invention are useful as agents for complexing metal and/or alkaline earth metal ions in aqueous media. The amount of polycarboxylate required to effectively complex the ions in a given system will depend, to some extent, on the particular polycarboxylate salt being used and the particular metal and alkaline earth metal ions in the aqueous media. Generally, complexing is more effective in basic solution. Optimum conditions and amounts of complexing agent can readily be determined by routine experimentation.

The tetrahydrofuran polycarboxylate salts are also useful as builders in detergent formulations. Generally, the use of the alkali metal salts, particularly the sodium salt is preferred. However, in some formulations (such as liquid formulations where greater builder solubility is required) the use of ammonium or alkanol ammonium salts may be desirable.

The detergent formulations of this invention will contain at least 1% by weight and preferably at least 5% by weight of the polycarboxylate salts of this invention. In order to obtain the maximum advantages of the builder compositions of this invention, the use of from 5% to 75% of these polycarboxylate salts is particularly preferred. The tetrahydrofuran polycarboxylic salt compounds of this invention can be the sole detergency builder or these compounds can be utilized in combination with other detergency builders which may constitute from 0 to 95% by weight of the total builders in the formulation. By way of example, builders which can be employed in combination with the novel builder compounds of this invention include water soluble inorganic builder salts such as alkali metal polyphosphates, i.e., the tripolyphosphates and pyrophosphates, alkali metal carbonates, borates, bicarbonates and silicates and water soluble organic builders including amino polycarboxylic acids and salts such as alkali metal nitrilotriacetates; cycloalkane polycarboxylic acids and salts, ether polycarboxylates, alkyl polycarboxylates, epoxy polycarboxylates, other tetrahydrofuran polycarboxylates such as 1,2,3,4 or 2,2,5,5 tetrahydrofuran tetracarboxylates, benzene polycarboxylates, oxidized starches, amino (trimethylene phosphonic acid) and its salts, diphosphonic acids and salts (e.g., methylene diphosphonic acid; 1-hydroxy ethylidene diphosphonic acid) and the like.

The detergent formulations of this invention will generally contain from 5% to 95% by weight total builder (although greater or lesser quantities may be employed if desired) which, as indicated above, may be solely the tetrahydrofuran polycarboxylic acids and/or salt compounds of this invention or mixtures of such compounds with other builders. The total amount of builder employed will be dependent on the intended use of the detergent formulation, other ingredients of the formulation, pH conditions and the like. For example, general laundry powder formulations will usually contain 20% to 60% builder; liquid dishwashing formulations 11% to 12% builder; machine dishwashing formulations 60% to 90% builder. Optimum levels of builder content as well as optimum mixtures of builders of this invention with other builders for various uses can be determined by routine tests in accordance with conventional detergent formulation practice.

The detergent formulations of this invention will generally contain a water soluble detergent surfactant although the surfactant ingredient may be omitted from machine dishwashing formulations. Any water soluble anionic, nonionic, zwitterionic or amphoteric surfactant can be employed.

Examples of suitable anionic surfactants include soaps such as the salts of fatty acids containing about 9 to 20 carbon atoms, e.g. salts of fatty acids derived from coconut oil and tallow; alkyl benzene sulfonates—particularly linear alkyl benzene sulfonates in which the alkyl group contains from 10 to 16 carbon atoms; alcohol sulfates; ethoxylated alcohol sulfates; hydroxy alkyl sulfonates; alkyl sulfates and sulfonates; monoglyceride sulfates; acid condensates of fatty acid chlorides with hydroxy alkyl sulfonates and the like.

Examples of suitable nonionic surfactants include alkylene oxide (e.g., ethylene oxide) condensates of mono and polyhydroxy alcohols, alkyl phenols, fatty acid amides, and fatty amines; amine oxides; sugar derivatives such as sucrose monopalmitate; long chain tertiary phosphine oxides; dialkyl sulfoxides; fatty acid amides, (e.g., mono or diethanol amides of fatty acids containing 10 to 18 carbon atoms), and the like.

Examples of suitable zwitterionic surfactants include derivatives of aliphatic quaternary ammonium compounds such as 3-(N,N-dimethyl-N-hexadecyl ammonio) propane-1-sulfonate and 3-(N,N-dimethyl-N-hexadecylammonio)-2-hydroxy propane-1-sulfonate.

Examples of suitable amphoteric surfactants include betaines, sulfobetains and fatty acid imidazole carboxylates and sulfonates.

It will be understood that the above examples of surfactants are by no means comprehensive and that numerous other surfactants are known to those skilled in the art. It will be further understood that the choice and use of surfactants will be in accordance with well understood practices of detergent formulation. For example, anionic surfactants, particularly linear alkyl benzene sulfonate are preferred for use in general laundry formulations, whereas low foaming nonionic surfactants are preferred for use in machine dishwashing formulations.

The quantity of surfactant employed in the detergent formulations of this invention will depend on the surfactant chosen and the end use of the formulation. In general, the formulations will contain from 5% to 50% surfactant by weight, although as much as 95% or more surfactant may be employed if desired. For example, general laundry powder formulations normally contain 5% to 50%, preferably 15% to 25% surfactant; machine dishwashing formulations 0.5% to 5%; liquid dishwashing formulations 20% to 45%. The weight ratio of surfactant to builder will generally be in the range of from 1:12 to 2:1.

In addition to builder and surfactant components, detergent formulations may contain fillers such as sodium sulfate and minor amounts of bleaches, dyes, optical brightners, soil anti-redeposition agents, perfumes and the like.

In machine dishwashing compositions the surfactant will be a low-foaming anionic surfactant which will constitute 0 to 5% of the formulation.

The term "low-foaming" surfactant connotes a surfactant which, in the foaming test described below, reduces the revolutions of the washer jet-spray arm during the wash and rinse cycles less than 15%, preferably less than 10%.

In the foaming test, 1.5 grams of surfactant is added to a 1969 Kitchen-Aid Home Dishwasher, Model No. KOS-16, manufactured by Hobart Manufacturing Company which is provided with means for counting revolutions of the washer jet-spray arm during wash and rinse cycles. The machine is operated using distilled water feed at a machine entrance temperature of 40°C. The number of revolutions of the jet-spray arm during the wash and rinse cycles is counted. The results are compared with those obtained by operation of the machine using no surfactant charge and percentage decrease in number of revolutions is determined.

The surfactant should, of course, be compatible with the chlorine containing component hereinafter discussed. Examples of suitable nonionic surfactants include ethoxylated alkyl phenols, ethoxylated alcohols (both mono- and di-hydroxy alcohols), polyoxyalkylene glycols, aliphatic polyethers and the like. The widely commercially utilized condensates of polyoxypropylene glycols having molecular weights of from about 1400 to 2200 with ethylene oxide (the ethylene oxide constituting 5 to 35 weight percent of the condensate) are, for example, advantageously used in the machine dishwashing formulations of this invention.

Suitable low-foaming anionic surfactants include alkyldiphenyl ether sulfonates such as sodium dodecyl diphenyl ether disulfonates and alkyl naphthalene sulfonates.

Mixtures of suitable low-foaming surfactants can be utilized if desired.

In addition, machine dishwashing formulations will contain sufficient chlorine providing compound to provide 0.5% to 2% available chlorine. For example, the formulation may contain from 0.5% to 5%, preferably 1% to 3% of a chlorocyanurate or from 10% to 30% chlorinated trisodium phosphate. Suitable chlorocyanurates are sodium and potassium dichlorocyanurate; [(monotrichloro) tetra-(mono potassium dichloro)] penta-isocyanurate; (mono-trichloro) (mono-potassium dichloro) di-isocyanurate.

Machine dishwashing compositions should additionally contain from 5% to 30% soluble sodium silicate having an $SiO_2$ to $Na_2O$ mole ratio of from 1:1 to 3.2:1 preferably about 2.4:1 to inhibit corrosion of metal parts of dishwashing machines and provide over-glaze protection to fine china.

Machine dishwashing compositions will generally contain at least 10%, preferably at least 20% builder, up to a maximum of about 90% builder. The new builder compounds of this invention should constitute at least 5% of the weight of the machine dishwashing formulation in order to obtain the full effects of their inherent characteristics.

The invention is further illustrated by the following examples which deal with the preparation and use of the particularly preferred tetrahydrofuran 2,2-trans-3,4,5,5-hexacarboxylate compounds. It will be recognized by those skilled in the art that other compounds of this invention can be prepared and utilized in a similar manner pursuant to the preceding discussion. In the examples, all parts and percentages are by weight unless otherwise indicated.

EXAMPLE I

Tetracyanoethylene oxide (56.6 grams); dimethyl fumarate (56.6 grams); ethylene dibromide solvent (450 ml.) are maintained at about 120°C with stirring for about 22 hours under nitrogen atmosphere in a glass flask fitted with a reflux condenser. A dark brown solution forms which is filtered while hot to remove minor amounts of unidentified solid impurities. The filtrate is dried on a rotary evaporator and the residue washed with diethylether and dried under nitrogen. The residue product is purified by dissolution in and crystallization from methyl alcohol followed by vacuum drying. The identity of the product as dimethyl tetrahydrofuran-trans-3,4-dicarboxylate-2,2,5,5,-tetranitrile is confirmed by elemental analysis and a H nuclear magnetic resonance spectrum in deuterated acetone in which the 3 and 4 protons appear as a singlet at 5.45 ppm; the ester $CH_3$ protons as a singlet at 4.10 ppm vs. TMS (relative areas 1:3).

Ninety grams of the dimethyl tetrahydrofuran-trans-3,4-dicarboxylate-2,2,5,5-tetranitrile; 21 grams water; 1000 ml. methyl alcohol are charged to a glass flask and the temperature of the mixture is held between 0° to 40°C while 50 grams of hydrogen chloride gas is bubbled into the mixture. The reaction mixture is filtered to remove ammonium chloride; 1.5 ml. concentrated sulfuric acid is added as catalyst to the filtrate which is then refluxed for about 30 hours. Upon cooling, solid product separates from the solution and is removed by filtration. The solid is dissolved in chloroform; washed with 5% sodium bicarbonate and water. The chloroform solution is dried over magnesium sulfate and the chloroform evaporated to leave an oily residue. Dissolution of the residue in methanol followed by crystallization yields a pure crystalline product. The identity of the product as hexamethyl tetrahydrofuran 2,2-trans-3,4,5,5 hexacarboxylate is confirmed by elemental analysis and a H nuclear magnetic resonance spectrum in deuterated chloroform which exhibits a singlet at 4.50 ppm corresponding to the 3 and 4 protons; a singlet at 4.02 ppm corresponding to the two $CH_3$ ester groups at the 3 and 4 positions; a singlet at 3.88 ppm corresponding to the four ester $CH_3$ groups at the 2 and 5 positions (relative areas 1:3:4).

EXAMPLE II

A mixture of 55.4 grams 50% sodium hydroxide; 100 ml. water; 48.5 grams hexamethyl tetrahydrofuran 2,2-trans-3,4,5,5 hexacarboxylate is heated under reflux at 90°C for 24 hours in a glass flask. The solution is concentrated by distillation of methanol and water from the flask. The reaction mixture is cooled to room temperature and product precipitated by addition of 1000 ml. methanol. The identity of the product as pentasodium monohydrogen tetrahydrofuran 2,2-trans-3,4,5,5 hexacarboxylate is confirmed by chemical analysis and a H nuclear magnetic resonance spectrum in deuterium oxide exhibiting a singlet at 4.1 ppm.

EXAMPLE III

Pentasodium monohydrogen tetrahydrofuran 2,2-trans-3,4,5,5 hexacarboxylate (289.2 mg.) is dissolved in 10 ml. deionized water and passed through a column packed with a strong acid ion exchange resin (sulfonated polystyrene marketed by Fisher Scientific Company under the trademark Rexyn 101). This procedure yields tetrahydrofuran 2,2-trans-3,4,5,5 hexacarboxylic acid. The titration curve of the acid with sodium hydroxide exhibits three breaks and indicates that four protons are highly acidic (apparent pKa's equal to or less than 5.7); a fifth proton is less acidic (apparent pKa of about 6.8); and the sixth proton has an apparent pKa of about 9.1.

EXAMPLE IV

Pentasodium monohydrogen tetrahydrofuran 2,2-trans-3,4,5,5 hexacarboxylate is tested for sequestration function using the procedures described by Matzner et al., "Organic Builder Salts as Replacements for Sodium Tripolyphosphate" *Tenside Detergents*, 10, Heft 3, pages 119 through 125 (1973). In this test, the divalent ion electrode shows two separate end points for titration of calcium ion with a solution of the hexacarboxylate salt. This is due to the formation of 2:1 and 1:1 (Ca++/ligand) complexes. The average sequestration values (intensity multiplied by capacity expressed as a percentage of sodium tripolyphosphate sequestration value are in the range of 138% to 188% depending upon the complex formed.

EXAMPLE V

Detergent formulations containing the percent builder shown in Table I below; 17% linear alkylbenzene sulfonate having an average molecular weight of about 230; 12% sodium silicate; remainder, sodium sulfate are prepared. The formulations are tested by washing identically soiled fabric swatches (indicated in the table) in water of 200 ppm hardness at 40°C containing 0.15% detergent formulation using identical washing techniques. The reflectivity of the soiled swatches before and after washing is measured instrumentally and the difference reported in Table I as Δ Rd. High Δ Rd values are indicative of correspondingly high detergency effectiveness.

TABLE I

| Builder | Cotton Fabric – ΔRd | | | Polyester/Cotton Fabric – ΔRd | | |
|---|---|---|---|---|---|---|
| | 50% Builder | 37.5% Builder | 25% Builder | 50% Builder | 37.5% Builder | 25% Builder |
| Pentasodium monohydrogen tetrahydrofuran 2,2-trans-3,4,5,5-hexacarboxylate | 28.7 | 27.1 | 21.3 | 13.5 | 10.1 | 9.8 |
| Sodium Tripolyphosphate | 26.2 | 19.0 | 14.5 | 12.0 | 8.7 | 5.7 |

EXAMPLE VI

Three pentasodium monohydrogen tetrahydrofuran 2,2-trans-3,4,5,5-hexacarboxylate built detergent formulations corresponding to those shown in Example V except that linear alkylbenzene sulfonate surfactant is replaced with:

1. a nonionic surfactant — a condensate of 7 molecular proportions of ethylene oxide with linear secondary alcohols containing 11 to 15 carbon atoms 2. an amphoteric surfactant — sodium hydroxyalkyl (alkyl group contains an average of 15 carbon atoms) N-methyltaurate 3. a zwitterionic surfactant —cocodimethylsulfopropylbetaine are prepared and tested. All three formulations exhibit effective detergency.

EXAMPLE VII

A machine dishwashing formulation containing 50% pentasodium monohydrogen tetrahydrofuran 2,2-trans-3,4,5,5-hexacarboxylate; 35% of an aqueous solution containing 47% sodium silicate having an $SiO_2$ to $Na_2O$ mole ratio of 2.4; 3% of a condensate of ethylene oxide with polyoxypropylene glycol marketed by Wyandotte Chemical Corporation as Pluronic L-62; 1.2% potassium dichlorocyanurate; 10.8% sodium sulfate is prepared. The formulation is used to wash soiled dishes and glassware in a conventional automatic home dishwashing machine. Excellent cleaning is obtained and, in particular, the glassware is found substantially free from filming and spotting.

EXAMPLE VIII

Three machine dishwashing formulations are prepared which are identical to that of Example VII except that the following surfactants are substituted for the ethylene oxide-polyoxypropylene glycol:

1. condensate of an internal, vicinal, linear diol having an average chain length of 16 carbon atoms with 3 molecular proportions of ethylene oxide
2. condensate of N-decanol with 2-½ molecular proportions ethylene oxide
3. sodium decydiphenyl ether disulfonate.

All three formulations provide excellent performance in cleaning dishes and glassware in a conventional automatic home dishwashing machine.

Other compounds of this invention can be prepared by techniques similar to those disclosed in Example I.

For example, Table II, below, indicates the esters which are obtained by reaction of various

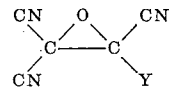

compounds with various

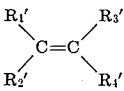

compounds followed by alcoholysis with methanol.

TABLE II

| Tetracyano ethylene oxide. | | |
|---|---|---|
| | Dimethyl malonate. | Mixtures of hexamethyl tetrahydrofuran 2,2-cis-3,4,5,5-hexacarboxylate and hexamethyl 2,2-cis-3,4,5,5-hexacarboxylate. |
| | Methyl acrylate. | Pentamethyl tetrahydrofuran-2,2,3,5,5-pentacarboxylate. |
| | Dimethyl/methylene malonate. | Hexamethyl tetrahydrofuran-2,2,3,3,5,5-hexacarboxylate. |
| | Trimethyl ethene-1,1,2-tricarboxylate. | Heptamethyl tetrahydrofuran-2,2,3,3,4,5,5-heptacarboxylate. |
| | Tetramethyl ethene-1,1,2,2-tetracarboxylate. | Octamethyl-tetrahydrofuran-2,2,3,3,4,4,5,5-octacarboxylate. |

TABLE II —Continued

| Tricyano ethylene oxide. | | |
|---|---|---|
| | Ethylene. | Trimethyl-tetrahydrofuran-2,2,5-tricarboxylate. |
| | Methyl acrylate. | Mixture of cis and trans tetramethyl tetrahydrofuran-2,2,3,5 and 2,2,4,5-tetracarboxylates. |
| | Dimethyl methylene malonate. | Mixture of pentamethyl tetrahydrofurna-2,2,3,3,5 and 2,2,4,4,5-pentacarboxylate. |
| | Dimethyl fumarate. | Mixture of pentamethyl tetrahydrofuran-2,2,-trans-3-cis-4,5 and 2,2-cis-3,5-trans-4 pentacarboxylate. |
| | Dimethyl maleate. | Mixture of pentamethyl tetrahydrofurna-cis-2,2,3,4,5 and 2,2-cis-3,4-trans-5-pentacarboxylate. |
| | Trimethyl ethene-1,1,2-tricarboxylate. | Mixture of cis and transhexamethyl tetrahydrofuran-2,2,3,3,4,5 and 2,2,3,4,4,5-hexacarboxylate. |
| | Tetramethyl ethene-1,1,2,2-tetracarboxylate. | Heptamethyl tetrahydrofuran-2,2,3,3,4,4,5-heptacarboxylate. |

Acids corresponding to the esters shown in Table II, above, and their corresponding totally or partially neutralized salts can be prepared by saponification and acidulation techniques comparable to those exemplified in Examples II and III.

What is claimed is:

1. A compound represented by the formula

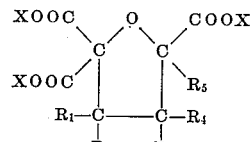

wherein X is selected from the group consisting of hydrogen, alkali metal, ammonium, alkanol ammonium wherein the alkyl moiety contains from 1 to 4 carbon atoms and alkyl groups containing from 1 to 20 carbon atoms; $R_1$, $R_2$, $R_3$, $R_4$ and $R_5$ are selected from the group consisting of hydrogen and COOX, at least one of $R_1$, $R_2$, $R_3$, and $R_4$ being COOX when $R_5$ is COOX.

2. A compound according to claim 1 wherein at least two of $R_1$, $R_2$, $R_3$ and $R_4$ are hydrogen.

3. A compound according to claim 1 wherein $R_5$ is COOX.

4. A compound according to claim 1 wherein X is hydrogen.

5. A compound according according to claim 1 wherein X is alkali metal.

6. A compound according to claim 1 wherein $R_1$ and $R_4$ are COOX and $R_2$ and $R_3$ are hydrogen.

7. A compound according to claim 6 characterized by trans orientation of $R_1$ and $R_4$.

8. Pentasodium monohydrogen tetrahydrofuran 2,2,3,4,5,5-hexacarboxylate.

9. Pentasodium monohydrogen tetrahydrofuran 2,2-trans-3,4,5,5-hexacarboxylate.

10. Hexasodium tetrahydrofuran 2,2,3,4,5,5-hexacarboxylate.

11. Hexasodium tetrahydrofuran 2,2-trans-3,4,5,5-hexacarboxylate.

* * * * *